United States Patent
Davydov

(10) Patent No.: US 10,594,427 B2
(45) Date of Patent: Mar. 17, 2020

(54) INTER EVOLVED NODEB COORDINATED BEAMFORMING

(71) Applicant: Intel Corporation, Santa Clara, CA (US)

(72) Inventor: Alexei Vladimirovich Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/300,171

(22) PCT Filed: May 12, 2017

(86) PCT No.: PCT/US2017/032341
§ 371 (c)(1),
(2) Date: Nov. 9, 2018

(87) PCT Pub. No.: WO2017/197224
PCT Pub. Date: Nov. 16, 2017

(65) Prior Publication Data
US 2019/0149256 A1    May 16, 2019

Related U.S. Application Data

(60) Provisional application No. 62/336,483, filed on May 13, 2016.

(51) Int. Cl.
*H04J 11/00* (2006.01)
*H04B 7/024* (2017.01)
(Continued)

(52) U.S. Cl.
CPC .......... *H04J 11/0053* (2013.01); *H04B 7/024* (2013.01); *H04B 7/063* (2013.01);
(Continued)

(58) Field of Classification Search
CPC . H04J 11/0053; H04B 7/0626; H04B 7/0632; H04B 7/063; H04B 7/0639; H04B 7/024; H04W 92/20
(Continued)

(56) References Cited

U.S. PATENT DOCUMENTS 7,676,007 B1    3/2010   Choi et al.
2009/0016460 A1   1/2009   Hwang et al.
(Continued)

FOREIGN PATENT DOCUMENTS

WO    WO-2017197224 A1    11/2017

OTHER PUBLICATIONS

"International Application Serial No. PCT/US2017/032341, International Search Report dated Sep. 1, 2017", 3 pgs.
(Continued)

*Primary Examiner* — Juan A Torres
(74) *Attorney, Agent, or Firm* — Schwegman Lundberg & Woessner, P.A.

(57) ABSTRACT

Methods and apparatus are described by using channel state information (CSI) associated with a CSI interference measurement from. The CSI is generated by user equipment. The CSI interference measurement is associated with an aggressor enhance Node B (eNB). The CSI is transmitted to the serving eNB. The CSI is then transmitted to the aggressor eNB over an X2 interface. The aggressor eNB determines beamforming restriction information based upon the CSI. The beamforming restriction information may then be transmitted to user equipment served by the aggressor eNB. The user equipment served by the aggressor eNB may use the beamforming restriction information in selecting channel state information reference signal resource indicator index or a precoding matrix indicator.

2 Claims, 6 Drawing Sheets

(51) Int. Cl.
*H04B 7/06* (2006.01)
*H04W 92/20* (2009.01)

(52) U.S. Cl.
CPC ......... *H04B 7/0626* (2013.01); *H04B 7/0632* (2013.01); *H04B 7/0639* (2013.01); *H04W 92/20* (2013.01)

(58) Field of Classification Search
USPC .......................................................... 375/267
See application file for complete search history.

(56) References Cited

U.S. PATENT DOCUMENTS

| | | | |
|---|---|---|---|
| 2013/0089040 A1* | 4/2013 | Tabet | H04L 5/0073 370/329 |
| 2013/0176887 A1* | 7/2013 | Seo | H04B 7/024 370/252 |
| 2013/0336214 A1* | 12/2013 | Sayana | H04B 7/024 370/328 |
| 2014/0086084 A1 | 3/2014 | Bi et al. | |
| 2015/0071191 A1* | 3/2015 | Kim | H04L 5/0057 370/329 |
| 2015/0215934 A1 | 7/2015 | Davydov et al. | |
| 2016/0105230 A1 | 4/2016 | Sidiropoulos et al. | |

OTHER PUBLICATIONS

"International Application Serial No. PCT/US2017/032341, Written Opinion dated Sep. 1, 2017", 8 pgs.

\* cited by examiner

INTER EVOLVED NODEB COORDINATED BEAMFORMING

PRIORITY CLAIM

This application is a U.S. National Stage Filing under 35 U.S.C. 371 from international Application No. PCT/US2017/032341, filed May 12, 2017 and published as WO 2017/197224 A1 on Nov. 16, 2017, which claims priority to U.S. Provisional Patent Application Ser. No. 62/336,486 filed May 13, 2016, entitled "X2 SIGNALLING TO SUPPORT INTER EVOLVED NODEB COORDINATED SCHEDULING/COORDINATED BEAMFORMING FECOMP" all of which are incorporated herein by reference in their entirety.

FIELD OF THE DISCLOSURE

Various embodiments generally may relate to the field of wireless communications.

BACKGROUND

Co-channel interference from the neighboring cells in a cellular network may be one of the most dominant limiting factors for achieving higher network efficiency especially for user equipment (UE) at cell edges. One way inter-cell interference problems have been addressed is by using coordinated multi-point (CoMP) techniques.

BRIEF DESCRIPTION OF THE DRAWINGS

The present disclosure is illustrated by way of example and not limitation in the figures of the accompanying drawings, in which like references indicate similar elements and in which.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

DESCRIPTION

Figure 1:
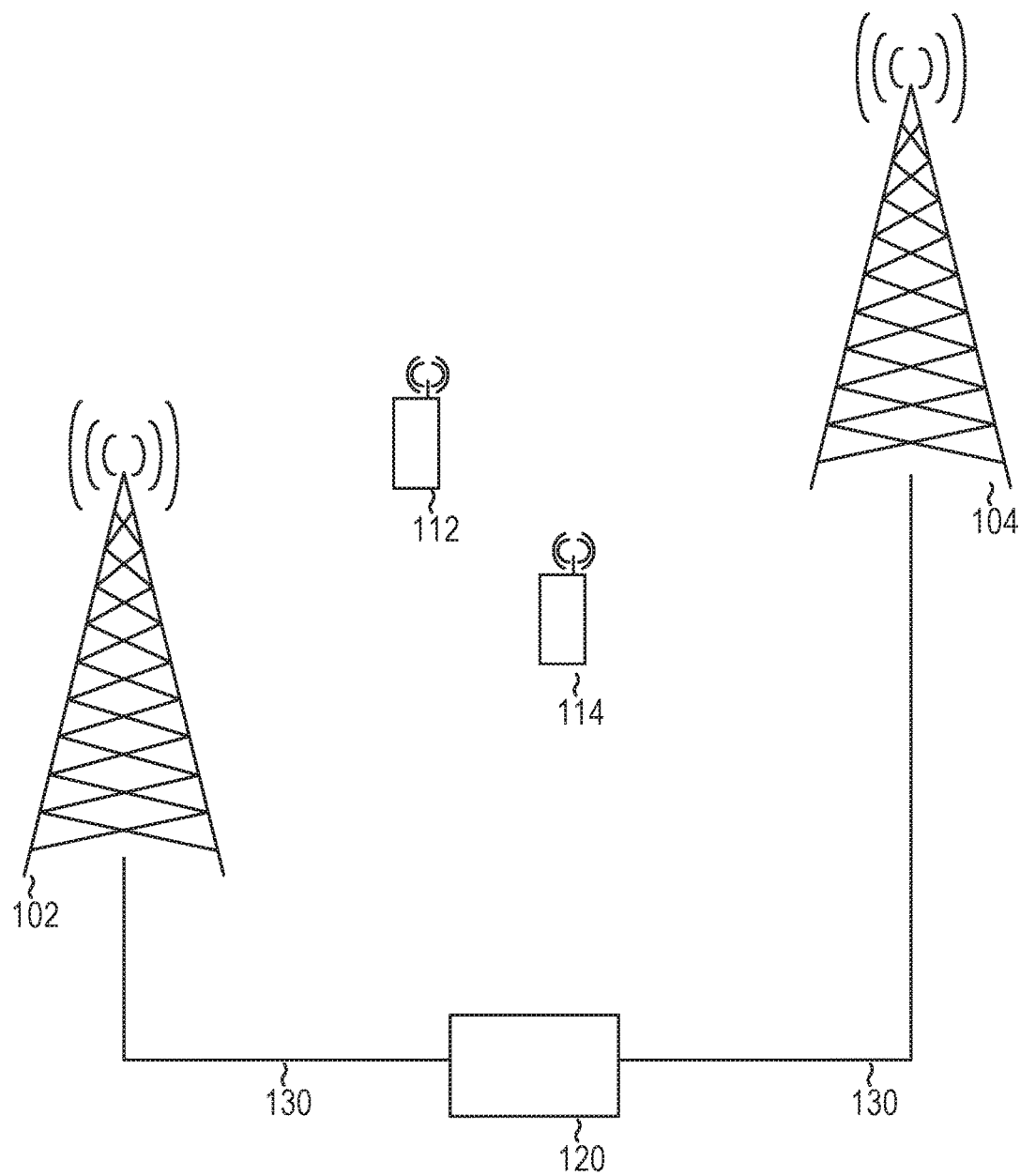
FIG. 1 is a block diagram of a system that uses inter-cell inference mitigation according to some embodiments described herein.

CoMP techniques help avoid interference by coordinating the transmitting nodes. FIG. 1 is a block diagram of a system 100 that uses inter-cell inference mitigation according to some embodiments described herein. Coordination schemes require evolved NodeB (eNB) architecture with multiple remote radio heads (RRH) 102 and 104, a central processing unit (CPU) 120 responsible for signal processing and coordination of RRHs and a high capacity and low latency backhaul link 130 that connects the RRHs 102 and 104, and the CPU 120. Not all long term evolution advanced (LTE-A) deployments have such an eNB implementation with close-to-ideal backhaul links. Without the proper deployment, the usage of the downlink (DL) CoMP schemes are limited to the specific scenarios.

In the scenarios where ideal backhaul link is not available, a CoMP non-ideal backhaul link (NIB) may be used to mitigate inter-cell co-channel interference. In these scenarios, channel quality information (CQI) for the links corresponding to interfering channels or eNB to assist coordinated scheduling (CS) decisions such as muting.

The CSI report for inter eNB signaling may support the wideband and subband CQI reports calculated by the UEs, such as UE 112 or UE 114.

| IE/Group Name | Presence | Range | IE type and reference | Semantics description |
|---|---|---|---|---|
| CSI Report per Cell | | 1 . . . <maxUEReport> | | |
| >UE ID | M | | BIT String (SIZE(16)) | ID assigned by eNB2 for the IE |
| >> CSI Process Configuration Index | M | | Integer (1 . . . 7, . . .) | Indicates one of the possible CSI Process configurations in the serving cell. |
| >> CSI Report per | | 1 . . . | | |

-continued

| CSI Process Item | | <maxUEReport> | | |
|---|---|---|---|---|
| >>>RI | M | | Integer(1 . . . 8, . . .) | The RI corresponding to the CQI being reported for the CSI process item. Value defined in TS 36.213 |
| >>>Wideband CQI | M | | 9.2.80 | |
| >>>Subband Size | M | | ENUMERATED(2, 3, 4, 6, 8, . . .) | Corresponds to a value of subband size k defined in TS 36.213 for the system bandwidth $N_{RB}^{DL}$ |
| >>>Subband CQI List | | 0 . . . <maxSubband> | | |
| >>>>Subband CQI | M | | 9.2.80 | |
| Subband Index | M | | Integer(0..27, . . .) | |

| Range bound | Explanation |
|---|---|
| maxUEReport | Maximum number of UE. Value is 128 |
| maxCSIProcess | Maximum number of CSI processes per UE. The value is 4. |
| maxCSIReport | Maximum number of CSI Reports per CSI Process. The value is 2. |
| maxSubband | Maximum number of subbands. The value is 14. |

It should be noted that the above CSI reporting only considers CQI signaling and, therefore, cannot support coordinated beamforming DL CoMP schemes. Additional enhancements for inter eNB signaling may be considered for LTE-A to support coordinated scheduling (CS)/coordinated beamforming (CB) CoMP schemes. For example, CSI reporting for X2 may be extended to include Channel State Information Reference Signal Index (CRS), precoding matrix indicator (PMI) or rank indicator (RI) calculated by the UE for interfering links. The information at a serving eNB can be used to perform interference mitigation using beamforming coordination with an aggressor/interfering eNB. The beamforming coordination may be provided by configuring codebook subset restriction to power offsets for CSI reference signals (CSI-RS) with different beamforming for the served UEs based on the received CSI information.

The PMI/RI calculated by UEs for a CSI process corresponding to an interfering eNB conveys some directional information about the interfering link. This direction information may be used by the interfering eNB as part of the eNB's beamforming. Specifically, the beamforming may be done to reduce the interference at the UE from the interfering link of the interfering/aggressor eNB. CQI calculations by the same UE may not provide sufficient accuracy to allow the interfering eNB to make beamforming decisions.

Figure 2:
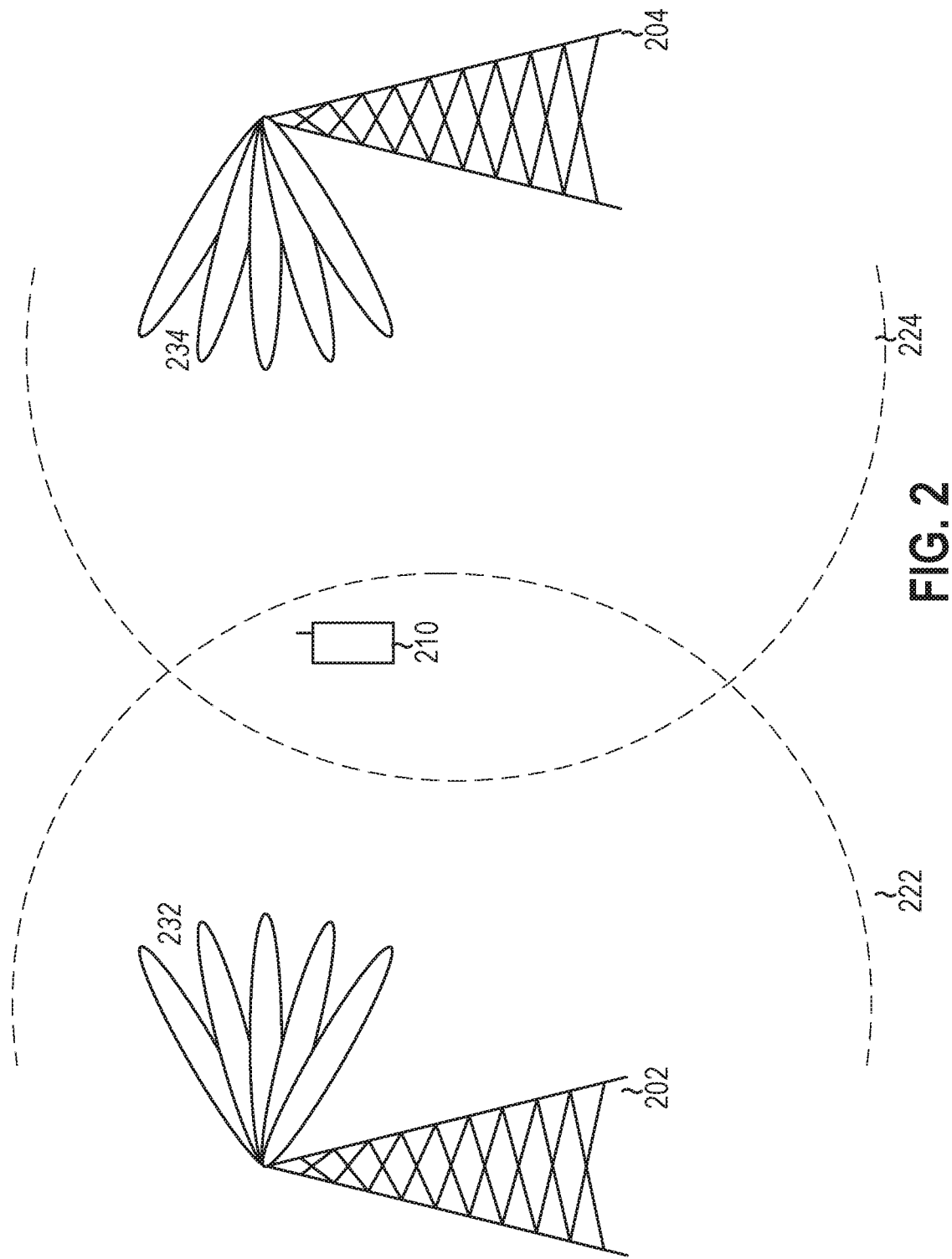
FIG. 2 is a block diagram illustrating channel state information (CSI) for a coordinated multipoint (CoMP) transmission according to some embodiments described herein.

FIG. 2 is a block diagram illustrating channel state information (CSI) for a coordinated multipoint (CoMP) transmission according to some embodiments described herein. A UE 210 is located at a cell edge of coverage 222 of a serving eNB 202 and also at a cell edge of coverage 224 of an interfering eNB 204. In the figure, the serving eNB 202 and the interfering eNB 224 are coordinating with one another. For example, information regarding the UE 210 is shared between the eNBs 202 and 204. In an example, the information may be shared over a backhaul link (not shown).

The UE may be configured with two CSI processes where each process is associated with multiple non-zero point (NZP) CSI-RS resources, such as 232 and 234, corresponding to vertical beams. The CQI reported by the UE for the interfering link will reflect the link quality of the interfering link, but not the link corresponding to the serving eNB 202.

The NZP CSI-RS resources corresponding to the interfering link may be used as interfering sources for a CQI calculation corresponding to the serving link. In this case, the CQI reported by the UE would reflect the expected link quality of the channel under different interfering hypothesis.

Figure 3:
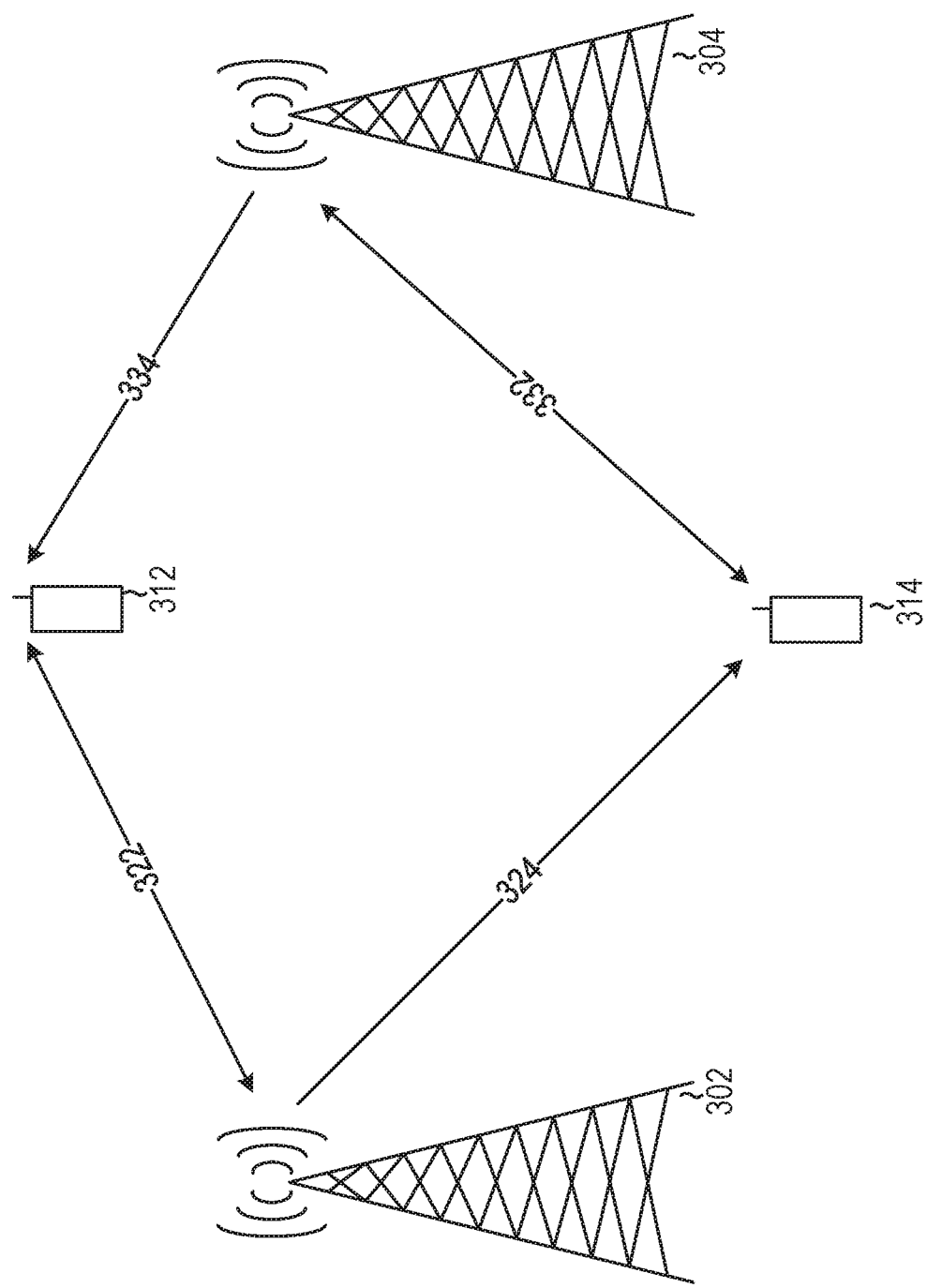
FIG. 3 is a block diagram illustrating interference in a CoMP environment according to some embodiments described herein.

Full-dimension multiple-input, and multiple-output (FD-MIMO) may support additional orthogonal demodulation reference signal (DM-RS) antenna ports to support multi-user, multiple-input, and multiple-output (MU-MIMO). The orthogonal DM-RS antenna port multiplexing may be provided by scheduling the DM-RS antenna ports for a physical downlink shared channel (PDSCH) transmission to different UEs and indicating in the downlink control indicator (DCI) the co-schedule DM-RS port assumptions. FIG. 3 is a block diagram illustrating interference in a CoMP environment according to some embodiments described herein. A first UE 312 may communicate with a transmission point (TP) such as an eNB 302 over link 322. Signals, beams, links, etc., 334 from another eNB 304 may provide interference to the UE 312. Additionally, the system may also include another UE 314 that is being served by the eNB 304 over link 332. Signals, beams, links, etc., 324 from the eNB 302 may interfere with the UE 314. Using orthogonal DM-RS antenna ports may reduce this interference. For example, the UE 312 may use DM-RS ports 9 and 11, while the UE 314 may use DM-RS ports 7. In a multi-point scenario with coordinated scheduling (CS) and coordinated beamforming (BCB), the orthogonal DM-RS antenna ports may be used to reduce interference on the received DM-RS antenna ports.

The X2 interface may be used for signaling for CQI and rank indicator (RI) information corresponding to interfering links. The CQI and RI information may be used to indicate the expected interference level from the neighboring cells to assist CS operations. For full dimension multiple input, multiple output (FD-MIMO) scenarios with non-ideal backhaul, a similar enhancement may be considered for CS/CB schemes. It has been found that vertical beamforming may have a noticeable impact on system performance due to inter transmission point (TP) interference. More specifically, depending on the antenna height and the deployment scenario the vertical beamforming at the TP with the elevations angles close to horizon may create server interference to the neighboring cells. To provide interference information for different elevation beamforming on the neighboring TPs, the CQI reporting for different CSI-RS resource indicator (CRI) indices of the neighboring TPs may be considered. Such information may be exchanged over an X2 interface between the neighboring eNBs. The interference information may be used to assist the beamforming restriction configurations (e.g. selection of a power offset (Pc) for a non-zero power (NZP) channel state information reference signal (CSI-RS) with different vertical beamforming). In an example, the PMI information may be exchanged, e.g., over an X2 interface, between eNBs. The PMI information may include only W1 (beamforming) component of the PMI. In addition, the information on NZP CSI-RS resources may be exchanged between eNBs to support channel measurements by the neighboring UEs.

To assist an interfering eNB's beamforming selection, the interfering eNB may utilize PMI, RI or CRI corresponding to the interference channels reported by the victim UEs. Such CSI information may be periodically obtained by the neighboring eNB from the served UEs and signaled to the interfering eNB via the backhaul link. The interfering eNB then may adjust the beamforming based on the provided information. In an example, the beamforming restrictions may be performed using codebookSubsetRestriction parameter which is provided by the interfering eNB. The interfering eNB may provide the beamforming restrictions to the UEs served by the interfering eNB. The UEs served by the interfering eNB may then select PMI or CRI that are not restricted based upon the received beamforming restrictions.

Figure 4:
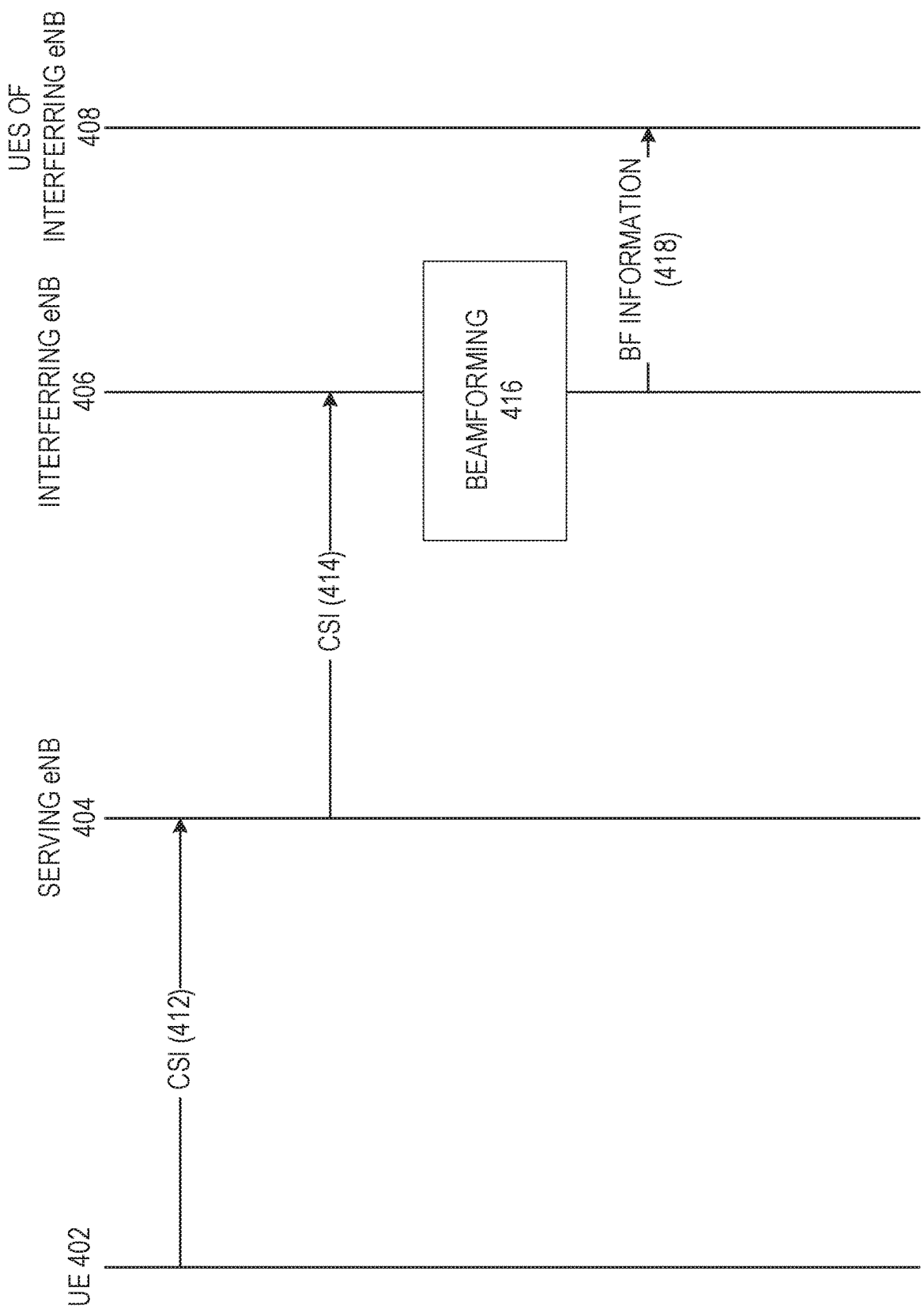
FIG. 4 is a diagram of messaging regarding beamforming at an interfering eNB according to some embodiments described herein.

FIG. 4 is a diagram of messaging regarding beamforming at an interfering eNB according to some embodiments described herein. An interfering eNB 406 may be a macro eNB that may perform interference avoidance in the spatial domain towards a cell-edge UE 402. A serving eNB 404 may serve the cell-edge UE 402. The serving eNB 404 may be a small cell eNB. The UE 402 may provide CSI feedback 412 that corresponds to one or more interfering channels to the serving eNB 404. The interfering channels may originate from the interfering eNB 406. The CSI feedback 412 may include a channel state information reference signal resource index (CRI), precoding matrix indicator (PMI), a channel quality indicator (CQI), a rank indicator (RI), or a precoding type indicator (PTI).

The serving eNB 404 may provide the CSI 414 to the interfering eNB 406 over an X2 interface. The interfering eNB 406 may then make beamforming decisions, such as beamforming restrictions 416, based upon the victims UE's CSI. The interfering eNB 406 may provide beamforming information 418 to inform its served UEs 408 about beamforming restrictions 416. For example, the beamforming restrictions may be communicated to the UE 408 using codebookSubsetRestriction parameter or by assigning different power offsets (Pc) to different NZP CSI-RS resources of Class B FD-MIMO with different beamforming. The interfering eNB 408 may then perform user scheduling by considering the semi-static beamforming restrictions on the specific time frequency resources. In an example the beamforming restriction 416 can be calculated by the serving eNB 404 and communicated to interfering eNB 406 using X2 interface. The interfering eNB 404 may inform its served UEs 408 about restriction in the beamforming using the codebookSubsetRestriction parameter or by assigning different power offsets (Pc) to different NZP CSI-RS resources of Class B FD-MIMO with different beamforming. The served UEs 408 may then use the beamforming restriction information received from the interfering eNB 406 to select PMI and CRI. The beamforming restriction information may indicate which PMI and/or CRI the UEs 408 should avoid.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 5:
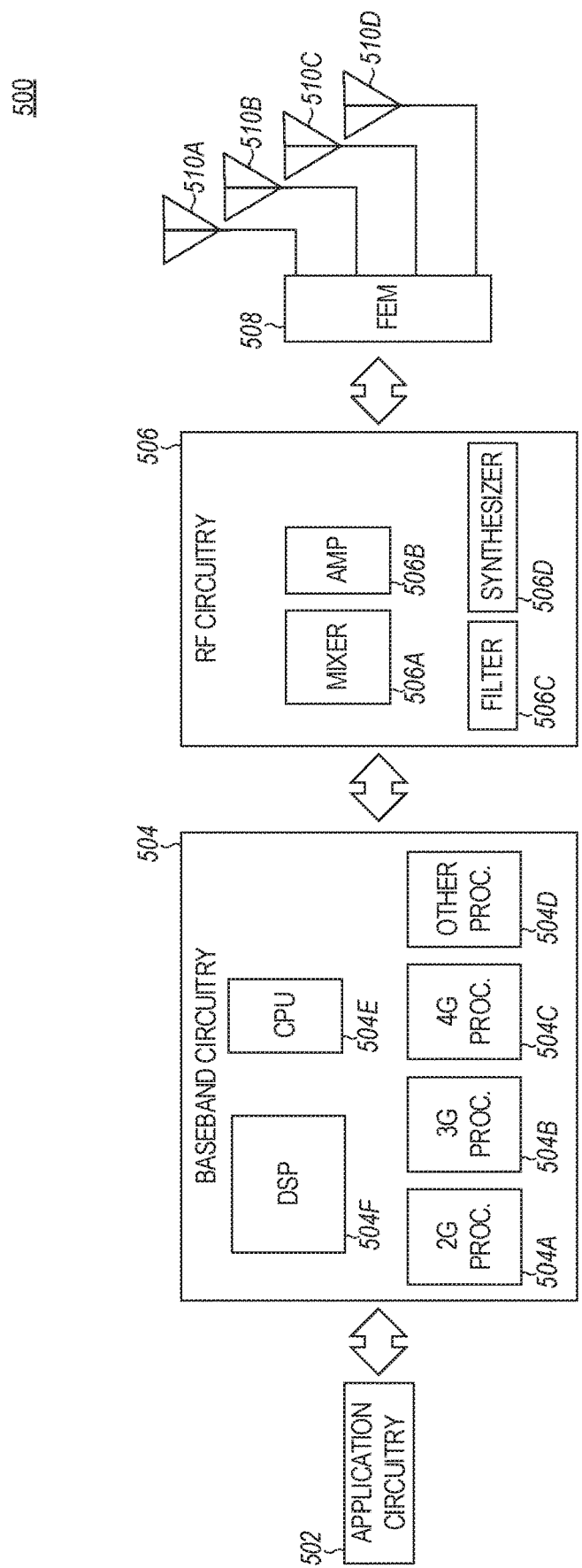
FIG. 5 is a block diagram of a User Equipment (UE) in accordance with some embodiments.

Embodiments described herein may be implemented into a system using any suitably configured hardware and/or software. FIG. 5 illustrates, for one embodiment, example components of a User Equipment (UE) device 500. The example components may also be used in an eNB. In some embodiments, the UE device 500 may include application circuitry 502, baseband circuitry 504, Radio Frequency (RF) circuitry 506, front-end module (FEM) circuitry 508 and one or more antennas 510, coupled together at least as shown.

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 504 may include circuitry such as, but not limited to, one or more single-core or multi-core processors. The baseband circuitry 504 may include one or more baseband processors and/or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a second generation (2G) baseband processor 504A, third generation (3G) baseband processor 504B, fourth generation (4G) baseband processor 504C, and/or other baseband processor(s) 504D for other existing generations, generations in development or to be developed in the future (e.g., fifth generation (5G), 6G, etc.). The baseband circuitry 504 (e.g., one or more of baseband processors 504A-D) may handle various radio control functions that enable communication with one or more radio networks via the RF circuitry 506. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, and/or constellation mapping/demapping functionality. In some embodiments, encoding/decoding circuitry of the baseband circuitry 504 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 504E of the baseband circuitry 504 may be configured to run elements of the protocol stack for signaling of the PHY, MAC, RLC, PDCP and/or RRC layers. In some embodiments, the baseband circuitry may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the RF circuitry 506 may include a receive signal path and a transmit signal path. The receive signal path of the RF circuitry 506 may include mixer circuitry 506A, amplifier circuitry 506B and filter circuitry 506C. The transmit signal path of the RF circuitry 506 may include filter circuitry 506C and mixer circuitry 506A. RF circuitry 506 may also include synthesizer circuitry 506D for synthesizing a frequency for use by the mixer circuitry 506A of the receive signal path and the transmit signal path. In some embodiments, the mixer circuitry 506A of the receive signal path may be configured to down-convert RF signals received from the FEM circuitry 508 based on the synthesized frequency provided by synthesizer circuitry 506D. The amplifier circuitry 506B may be configured to amplify the down-converted signals and the filter circuitry 506C may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506A of the receive signal path may comprise passive mixers, although the scope of the embodiments is not limited in this respect.

In some embodiments, the mixer circuitry 506A of the transmit signal path may be configured to up-convert input baseband signals based on the synthesized frequency provided by the synthesizer circuitry 506D to generate RF output signals for the FEM circuitry 508. The baseband signals may be provided by the baseband circuitry 504 and may be filtered by filter circuitry 506C. The filter circuitry 506C may include a low-pass filter (LPF), although the scope of the embodiments is not limited in this respect.

In some embodiments, the mixer circuitry 506A of the receive signal path and the mixer circuitry 506A of the transmit signal path may include two or more mixers and may be arranged for quadrature downconversion and/or upconversion respectively. In some embodiments, the mixer circuitry 506A of the receive signal path and the mixer circuitry 506A of the transmit signal path may include two or more mixers and may be arranged for image rejection (e.g., Hartley image rejection). In some embodiments, the mixer circuitry 506A of the receive signal path and the mixer circuitry 506A may be arranged for direct downconversion and/or direct upconversion, respectively. In some embodiments, the mixer circuitry 506A of the receive signal path and the mixer circuitry 506A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506D may be a fractional-N synthesizer or a fractional N/N+1 synthesizer, although the scope of the embodiments is not limited in this respect as other types of frequency synthesizers may be suitable. For example, synthesizer circuitry 506D may be a delta-sigma synthesizer, a frequency multiplier, or a synthesizer comprising a phase-locked loop with a frequency divider.

The synthesizer circuitry 506D may be configured to synthesize an output frequency for use by the mixer circuitry 506A of the RF circuitry 506 based on a frequency input and a divider control input. In some embodiments, the synthesizer circuitry 506D may be a fractional N/N+1 synthesizer.

In some embodiments, frequency input may be provided by a voltage controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506D of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510A-D.

In some embodiments, the FEM circuitry 508 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510.

In some embodiments, the UE device 500 may include additional elements such as, for example, memory/storage, display, camera, sensor, and/or input/output (I/O) interface.

Example Machine Description

Figure 6:
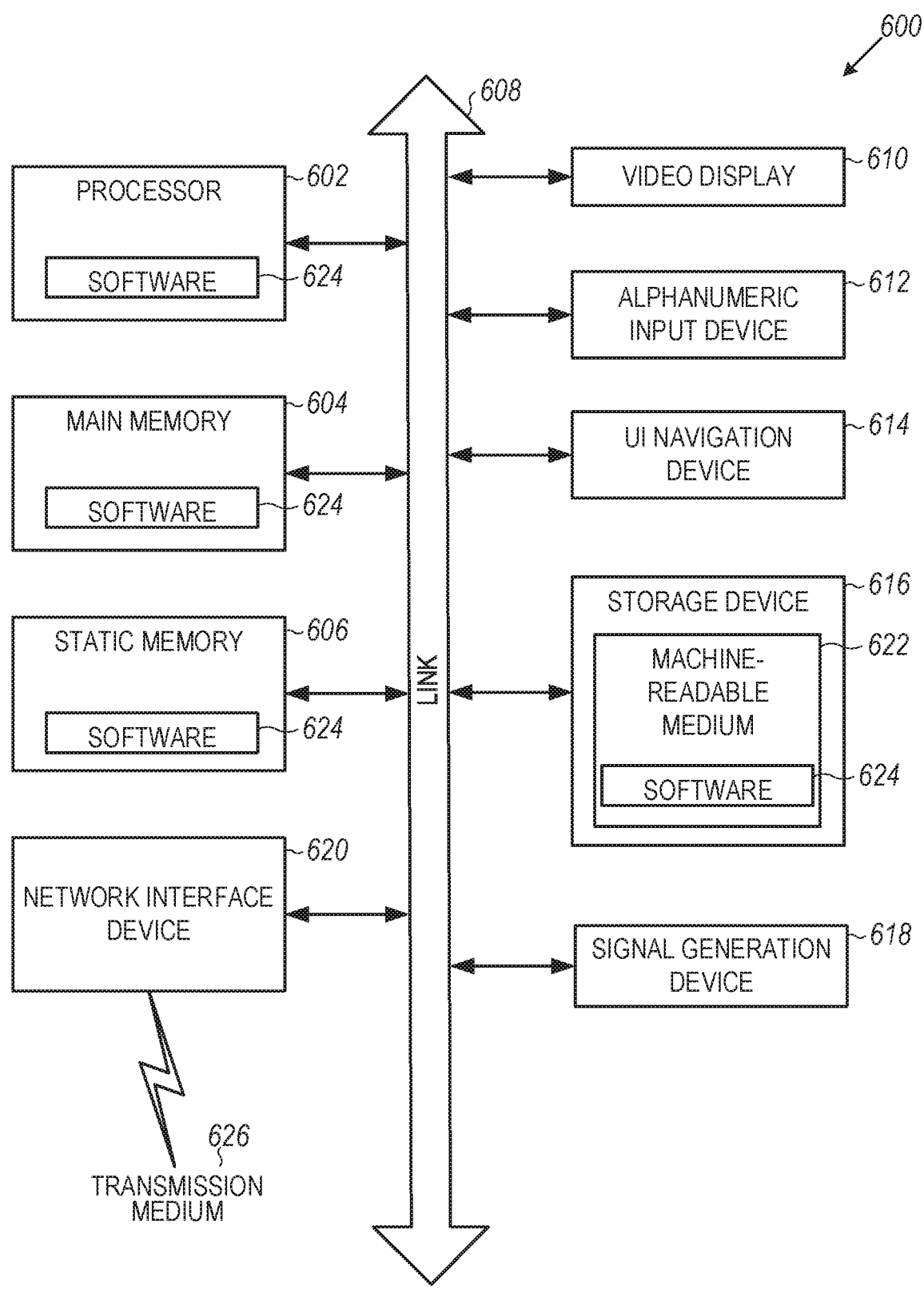
FIG. 6 illustrates a block diagram of a communication device such as an eNB or a UE, in accordance with some embodiments.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors, such as a global positioning system (GPS) sensor, compass, accelerometer, or other sensor. The machine 600 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.16.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Additional Notes and Examples

Example 1 is an apparatus of an interfering evolved Node B (eNB), the apparatus comprising: memory; and processing circuitry, to: receive channel state information (CSI), over an X2 interface from a serving eNB, associated with a CSI reference signal (CSI-RS) from a user equipment (UE) served by the serving eNB, the CSI-RS associated with the interfering eNB; determine beamforming restrictions for UE served by the interfering eNB based upon the CSI from the serving eNB; and encode the beamforming restriction information for transmission to the UE served by the interfering eNB.

In Example 2, the subject matter of Example 1 optionally includes the CSI comprising a precoding matrix indicator (PMI).

In Example 3, the subject matter of any one or more of Examples 1-2 optionally include the CSI comprising a channel quality indicator (CQI).

In Example 4, the subject matter of any one or more of Examples 1-3 optionally include the CSI comprising a rank indicator (RI).

In Example 5, the subject matter of any one or more of Examples 1-4 optionally include the CSI comprising a precoding type indicator (PTI).

In Example 6, the subject matter of any one or more of Examples 1-5 optionally include the CSI comprising a CSI-RS resource indicator.

In Example 7, the subject matter of any one or more of Examples 1-6 optionally include component of a precoding matrix indicator (PMI) from the second eNB 7 is missing parent: 8. The apparatus of Example 1, the processing circuitry to determine non-zero power (NZP) power offsets (Pc) of the CSI-RS.

In Example 8, the subject matter of Example undefined optionally includes, the processing circuitry to prepare to transmit the NZP Pc to the UE.

In Example 9, the subject matter of any one or more of Examples 1-8 optionally include the beamforming restriction information comprising power offsets assigned to different non-zero power (NZP) CSI-RS.

In Example 10, the subject matter of Example 9 optionally includes the beamforming restriction information comprising NZP CSI-RS parameters, the NZP CSI-RS parameters comprising one or more of a number of antenna ports, a subframe configuration, a resource configuration, or a scrambling identity.

In Example 11, the subject matter of any one or more of Examples 1-10 optionally include the beamforming restriction information comprising a codebookSubsetRestriction parameter.

Example 12 is a computer-readable medium comprising instructions to cause an interfering enhanced node B (eNB), upon execution of the instructions by processing circuitry of the serving eNB, to: receive channel state information (CSI), over an X2 interface from a serving eNB, associated with a CSI reference signal (CSI-RS) from a user equipment (UE) served by the serving eNB, the CSI-RS associated with the interfering eNB; determine beamforming restrictions for UE served by the interfering eNB based upon the CSI from the serving eNB; and encode the beamforming restriction information for transmission to the UE served by the interfering eNB.

In Example 13, the subject matter of Example 12 optionally includes the CSI comprising one of a precoding matrix indicator (PMI), a channel quality indicator (CQI), a rank indicator (RI), a precoding type indicator (PTI), or a CSI-RS resource indicator (CRI).

In Example 14, the subject matter of any one or more of Examples 12-13 optionally include component of a precoding matrix indicator (PMI) from the second eNB.

In Example 15, the subject matter of any one or more of Examples 12-14 optionally include the processing circuitry to determine non-zero power (NZP) power offsets (Pc) of the CSI-RS.

In Example 16, the subject matter of any one or more of Examples 12-15 optionally include the beamforming restriction information comprising power offsets assigned to different non-zero power (NZP) CSI-RS.

In Example 17, the subject matter of any one or more of Examples 12-16 optionally include the beamforming restriction information comprising a codebookSubsetRestriction parameter.

Example 18 is an apparatus of a serving evolved Node B (eNB), the apparatus comprising: memory; and processing circuitry, to: receive channel state information (CSI) from a user equipment (UE), the CSI associated with a CSI resource (CSI-RS), the CSI-RS associated with an interfering eNB; determine beamforming restriction for the interfering eNB information based on the CSI; and transmit the beamforming restriction information to the interfering eNB over an X2 interface.

In Example 19, the subject matter of Example 18 optionally includes the CSI comprising one of a precoding matrix indicator (PMI), a channel quality indicator (CQI), a rank indicator (RI), a precoding type indicator (PTI), or a CSI-RS resource indicator (CRI).

In Example 20, the subject matter of any one or more of Examples 18-19 optionally include component of a precoding matrix indicator (PMI) to the serving eNB.

In Example 21, the subject matter of any one or more of Examples 18-20 optionally include the beamforming restriction information comprising power offsets assigned to different non-zero power (NZP) CSI-RS.

In Example 22, the subject matter of Example 21 optionally includes the beamforming restriction information comprising NZP CSI-RS parameters, the NZP CSI-RS parameters comprising one or more of a number of antenna ports, a subframe configuration, a resource configuration, or a scrambling identity.

In Example 23, the subject matter of any one or more of Examples 18-22 optionally include the beamforming restriction information comprising a codebookSubsetRestriction parameter.

Example 24 is a computer-readable medium comprising instructions to cause an interfering enhanced node B (eNB), upon execution of the instructions by processing circuitry of the aggressor eNB, to: receive channel state information (CSI) from a user equipment (UE), the CSI associated with a CSI resource (CSI-RS), the CSI-RS associated with an interfering eNB; determine beamforming restriction for the interfering eNB information based on the CSI; and transmit the beamforming restriction information to the interfering eNB over an X2 interface.

In Example 25, the subject matter of Example 24 optionally includes the CSI comprising one of a precoding matrix indicator (PMI), a channel quality indicator (CQI), a rank indicator (RI), a precoding type indicator (PTI), or a CSI-RS resource indicator (CRI).

In Example 26, the subject matter of any one or more of Examples 24-25 optionally include the processing circuitry to prepare to transmit non-zero power (NZP) power offsets (Pc) of the CSI-RS from to the serving eNB.

In Example 27, the subject matter of any one or more of Examples 24-26 optionally include the beamforming restriction information comprising power offsets assigned to different non-zero power (NZP) CSI-RS.

In Example 28, the subject matter of any one or more of Examples 24-27 optionally include the beamforming restriction information comprising a codebookSubsetRestriction parameter.

Example 29 is an apparatus of an interfering evolved Node B (eNB), comprising means for performing the functions performed by the memory and processing circuitry of any of Examples 1 through 11.

Example 30 is an apparatus of a serving evolved Node B (eNB), comprising means for performing the functions performed by the memory and processing circuitry of any of Examples 18 through 23.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect. An example LTE system includes a number of mobile stations, defined by the LTE specification as User Equipment (UE), communicating with a base station, defined by the LTE specifications as an eNB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

In some embodiments, a receiver as described herein may be configured to receive signals in accordance with specific communication standards, such as the Institute of Electrical and Electronics Engineers (IEEE) standards including IEEE 802.11 standards and/or proposed specifications for WLANs, although the scope of the disclosure is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16 (m) standards for wireless metropolitan area networks (WMANs) including variations and evolutions thereof, although the scope of the disclosure is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus of a serving evolved Node B (eNB), the apparatus comprising:
   memory; and
   processing circuitry coupled to the memory,
   wherein the processing circuitry is configured to:
   encode control signalling for transmission to a user equipment (UE) served by the serving eNB, the control signalling to configure the UE with non-zero power channel state information reference signals (NZP-CSI-RS) to perform a first and a second channel state information (CSI) reporting process, wherein the first CSI reporting process is for reporting channel information based on the configured NZP-CSI-RS associated with the serving eNB and the second CSI reporting process is for reporting channel information based on the configured NZP CSI-RS associated with an interfering eNB;
   decode channel state information (CSI) received from the UE, the CSI based on the first and second CSI reporting processes;
   determine a beamforming restriction for the interfering eNB and a beamforming restriction for the serving eNB based on the CSI, the beamforming restrictions determined for coordinated beamforming to reduce interference from the interfering eNB at the UE served by the serving eNB, the beamforming restrictions comprising codebook subset restrictions; and
   encode X2 signalling to include the beamforming restriction for the interfering eNB for transmission over an X2 interface, the X2 signalling to cause the interfering eNB to provide the beamforming restriction to one or more UEs served by the interfering UE for precoding matrix indicator (PMI) selection; and
   encode control signalling for transmission to the UE served by the serving eNB, the control signalling to include the beamforming restriction for the serving eNB for PMI selection by the UE served by the serving eNB,
   wherein the memory is configured to store the beamforming restriction for the serving eNB.

2. A non-transitory computer-readable medium comprising instructions to cause a serving enhanced node B (eNB), upon execution of the instructions by processing circuitry of the serving eNB, to:
   encode control signalling for transmission to a user equipment (UE) served by the serving eNB, the control signalling to configure the UE with non-zero power channel state information reference signals (NZP-CSI-RS) to perform a first and a second channel state information (CSI) reporting process, wherein the first CSI reporting process is for reporting channel information based on the configured NZP-CSI-RS associated with the serving eNB and the second CSI reporting process is for reporting channel information based on the configured NZP CSI-RS associated with an interfering eNB;
   decode channel state information (CSI) received from the UE, the CSI based on the first and second CSI reporting processes;
   determine a beamforming restriction for the interfering eNB and a beamforming restriction for the serving eNB based on the CSI, the beamforming restrictions determined for coordinated beamforming to reduce interference from the interfering eNB at the UE served by the serving eNB, the beamforming restrictions comprising codebook subset restrictions; and encode X2 signalling to include the beamforming restriction for the interfering eNB for transmission over an X2 interface, the X2 signalling to cause the interfering eNB to provide the beamforming restriction to one or more UEs served by the interfering UE for precoding matrix indicator (PMI) selection; and encode control signalling for transmission to the UE served by the serving eNB, the control signalling to include the beamforming restriction for the serving eNB for PMI selection by the UE served by the serving eNB.

* * * * *